(12) United States Patent
Evans

(10) Patent No.: US 7,265,353 B2
(45) Date of Patent: Sep. 4, 2007

(54) DATA ACQUISITION, CONTROL, AND SPECTRAL ANALYSIS SOFTWARE FOR MULTI-CHANNEL ANALYZERS

(75) Inventor: Rollin M. Evans, Albuquerque, NM (US)

(73) Assignee: ARA, Inc., Albuquerque, NM (US)

( * ) Notice: Subject to any disclaimer, the term of this patent is extended or adjusted under 35 U.S.C. 154(b) by 337 days.

(21) Appl. No.: 10/765,116

(22) Filed: Jan. 28, 2004

(65) Prior Publication Data

US 2005/0161607 A1 Jul. 28, 2005

(51) Int. Cl.
*G01T 1/20* (2006.01)

(52) U.S. Cl. ............... 250/366; 250/358.1; 250/359.1; 250/360.1; 250/369

(58) Field of Classification Search ............... 250/366, 250/369, 358.1, 359.1, 360.1, 394
See application file for complete search history.

(56) References Cited

U.S. PATENT DOCUMENTS

| | | | | |
|---|---|---|---|---|
| 4,059,762 A | * | 11/1977 | Horrocks | 250/336.1 |
| 4,194,634 A | * | 3/1980 | Kelly | 209/589 |
| 4,317,033 A | * | 2/1982 | Panenka et al. | 250/253 |
| 4,434,365 A | * | 2/1984 | Bohme et al. | 250/255 |
| 4,509,042 A | * | 4/1985 | Kruse | 340/600 |
| 4,931,646 A | * | 6/1990 | Koechner et al. | 250/367 |
| 5,679,956 A | * | 10/1997 | Johnston | 250/357.1 |
| 5,705,818 A | * | 1/1998 | Kelbel et al. | 250/361 R |
| 2003/0178575 A1 | * | 9/2003 | Mallette | 250/394 |
| 2005/0029460 A1 | * | 2/2005 | Iwatschenko-Borho et al. | 250/359.1 |

FOREIGN PATENT DOCUMENTS

DE 19711124 A1 * 11/1997

* cited by examiner

*Primary Examiner*—Albert Gagliardi
(74) *Attorney, Agent, or Firm*—Ted Sabety; Sabety & Assoc. PLLC

(57) ABSTRACT

A system for detecting and identifying low-level (weak) radioactive sources moving past stationary detectors. The system, which can detect low-level sources moving at speeds of 30 m/s (about 70 mph), uses the differences between background counts and gamma counts from a moving source to determine that a source has passed the detector, when a source has passed the detector, and the identification of the source. This system has been demonstrated to work successfully for ordinary passenger vehicles transporting a variety of sources, and also for boats at lower speeds on a waterway.

48 Claims, 3 Drawing Sheets

FIG. 1
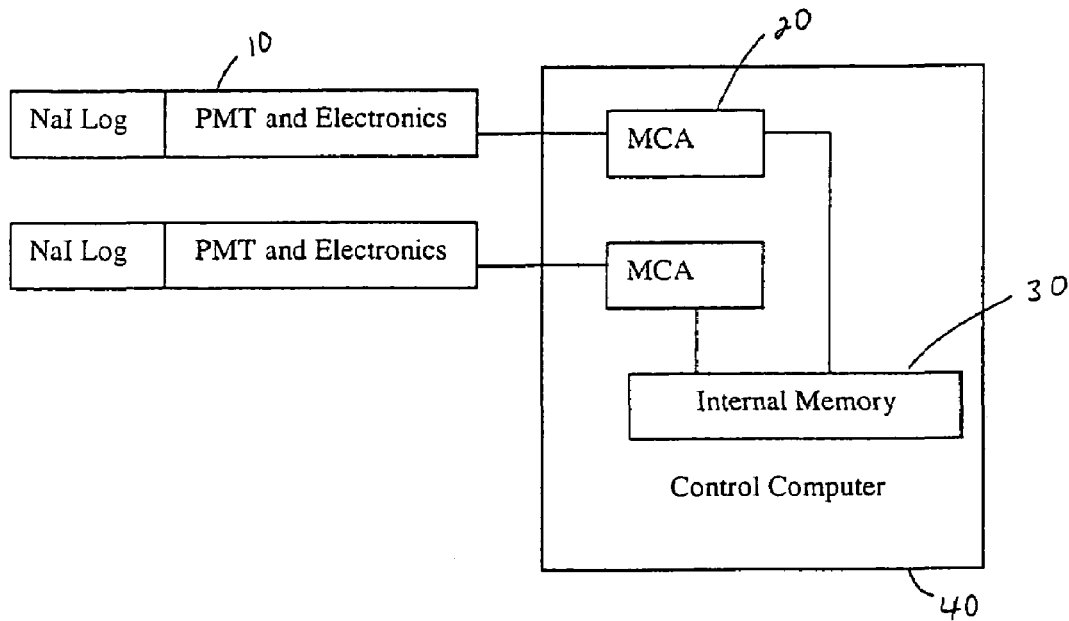
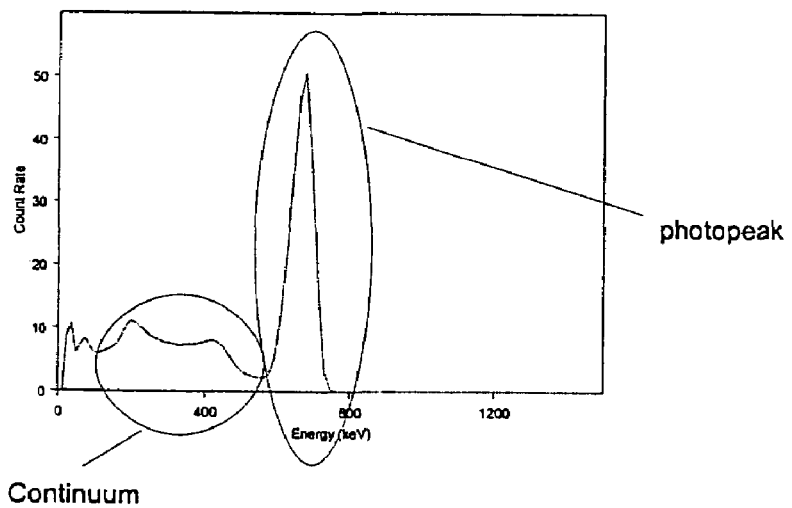
FIG. 2

DATA ACQUISITION, CONTROL, AND SPECTRAL ANALYSIS SOFTWARE FOR MULTI-CHANNEL ANALYZERS

BACKGROUND OF THE INVENTION

1. Field of the Invention

The present invention is related to the field of radioactive source identification and, more particularly, to a device for detecting and identifying low-level radioactive sources moving past stationary detectors.

2. Description of the Related Art

According to the prior art, detection of radioactive sources has not been accomplished at full highway speeds, a scenario known as drive-by or pass-by detection, and certainly real-time identification of sources at these speeds has not been possible. By contrast, most nuclear radiation detection is done using a detector and source that are both stationary.

Since, due to source speed, the interaction time of the radioactive source with the detector is short in a drive-by detection scenario, detector counting time must also be short. This leads to many counting intervals each second. In order for the system to be sensitive, it must be capable of reacting to a small number of counts. However, if the system reacts to a small number of counts, it is possible that normal background fluctuations may activate the system. The high frequency of the time slices thus forces the threshold of the system to be high, to keep the false alarm rate low, but a high threshold is inconsistent with sensitivity to a low count source. Therefore, a need exists for a system that is able to detect radioactive sources moving at highway speeds, having high sensitivity coupled with substantial resistance to false alarms.

SUMMARY OF THE INVENTION

In view of the foregoing, one object of the present invention is to overcome the difficulties associated with detection of low-level radiation sources in drive-by or pass-by detection scenarios.

Another object of the present invention is to provide a detector that counts in small time slices on the order of one eighth of a second to accommodate the high speed of the source.

A further object of the present invention is to provide a detector that uses the differences between source counts and background counts to distinguish between the two, providing the high sensitivity with low false alarm rate needed for such a system to be useful.

In accordance with these and other objects, the present invention is directed to a method for detecting and identifying low-level radioactive sources moving past at least two stationary detectors by comparing stored background spectra representing an expected number of counts over one or more time slices in one or more channels for each of the detectors with currently received spectra in a corresponding time period and channel range for each detector. A probability that the number of counts received by each of the detectors is attributable to background is calculated and, depending upon the relationship of the two probabilities to each other and to a threshold value, it is determined whether or not the source of the counts is a radioactive source.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a block diagram of the hardware for a detector system in accordance with the present invention;

FIG. 2 illustrates a representative photopeak for radioactive cesium ($^{137}$Cs);

DETAILED DESCRIPTION OF THE PREFERRED EMBODIMENTS

Figure 3:
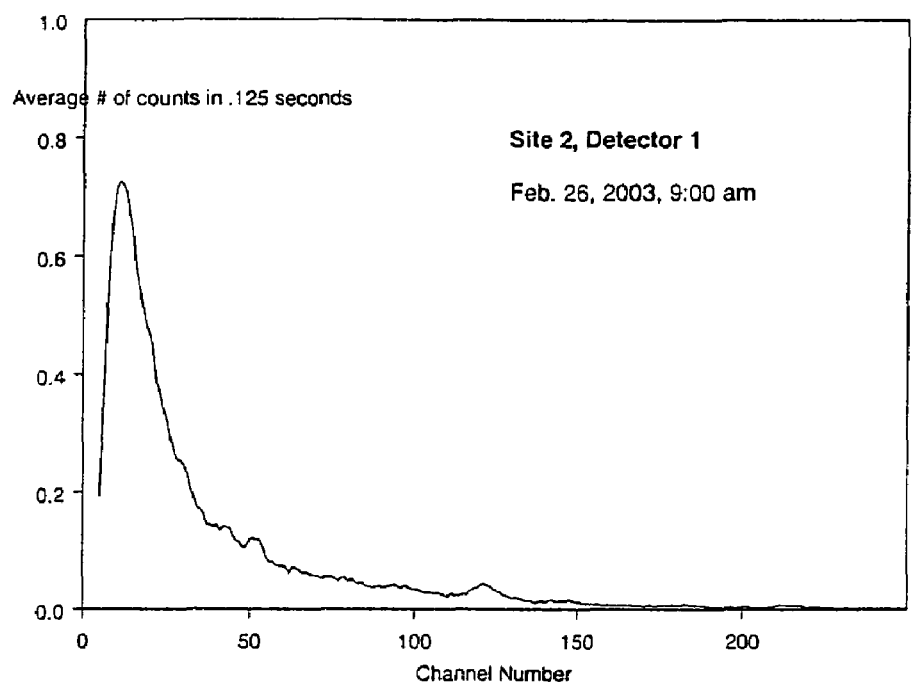
FIG. 3 is a graph of an expected number of background counts in a 0.125 second time slice ($r_i\tau$)

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

As shown in FIG. 1, the system includes two or more NaI(Tl) detectors 10, each including a sodium iodide (NaI) crystal with an associated photomultiplier tube (PMT) and electronics. The NaI crystals are sensitive to gamma rays from a radioactive source, producing a flash of light in response to absorption of these rays which is detected and processed by the PMT and electronics for further processing by a respective one of a plurality of multichannel analyzers 20 which are, in turn, coupled to an internal memory 30 within a control computer 40. Each multichannel analyzer (MCA) 20 provides the energy vs. count distribution for a respectively connected NaI detector 10. As the potential interaction time is very short (~0.2–0.3 seconds), the MCA must acquire data in very small time slices (~0.1–0.125 seconds). For the hit determination algorithm to work optimally, the acquisition time slices must be about one-third to one-half of the smallest expected interaction time.

In the short interaction time used, the relative fluctuations of counts in any given channel may be quite large. However, as there are certain indicators that typically accompany source versus background counts, the spectra obtained from the MCA's are checked for events that are not likely to have come from background fluctuations.

Background fluctuations have three main characteristics that are important to the effective operation of the system according to the present invention. First, background counts are not correlated with respect to channel numbers. Therefore, if there is a count in channel i, there is no greater probability of a count appearing in channel i−1 or channel i+1. Second, background counts are not correlated with respect to time slice; if there is a count in channel i during time slice j, then there is no greater probability of a count appearing in time slice j−1 or j+1. Third, background counts are not correlated with respect to detector such that, if there is a count in channel i of detector 1, there is no greater probability of there being a count in channel i of detector 2.

Counts from sources follow different patterns from those demonstrated by background counts. Particularly, counts from sources tend to group around the source photopeak such that there exists a channel or group of channels where source counts are more likely to occur, depending on the γ energy of the source. As previously noted, the NaI detectors produce a flash of light in response to gamma ray absorption. For gamma rays that have all of their energy converted to light, i.e., they are completely absorbed, the MCA puts those counts into a few channels which represent the photopeak for that source, while gamma rays that are not completely converted to light occur in what is known by those of skill in the art as the Compton Continuum; a representative photopeak and Compton Continuum for a cesium source ($^{137}$Cs) is shown in FIG. 2.

Next, source counts arrive only during time slices during which the source was close to the detector. Thus, if for two to three time slices there are counts in channel i during time slice j, there will be a greater probability of counts occurring during time slice j−1 or j+1 if the counts arise from a radioactive source.

Finally, source counts are correlated with respect to detector; if counts from a source occur in channel i of detector 1, there is a greater probability of counts occurring in channel i of detector 2, assuming proper calibration of the two detectors.

Accordingly, the analysis algorithm according to the present invention looks for the correlations that are unique to source counts. When events with a high degree of correlation consistent with source counts appear, they are counted as a source. The power of the technique is that the probability of the predictable patterns caused by γ ray sources occurring as a result of background fluctuations is so small as to be virtually non-existent.

Analysis Algorithm

In a given channel, the mean number of counts expected from the background during a time slice is given by Poisson statistics $$P_i(n)=(r_i\tau)^n\exp(-r_i\tau)/n!, \qquad \text{Equation 1}$$

where $P_i(n)$ is the probability of obtaining n counts in channel i, $r_i$ is the background rate of channel i, $\tau$ is the counting or acquisition time of the time slice, and n is the number of counts in channel i. With the value of $r_i\sigma$ representing the background spectra, the hit detection algorithm takes the number of counts in a channel and calculates the probability that the counts came from the background. If the probability is below a threshold, it is assumed that the counts did not come from background fluctuation, that is, the counts came from a nearby radioactive source.

Figure 4:
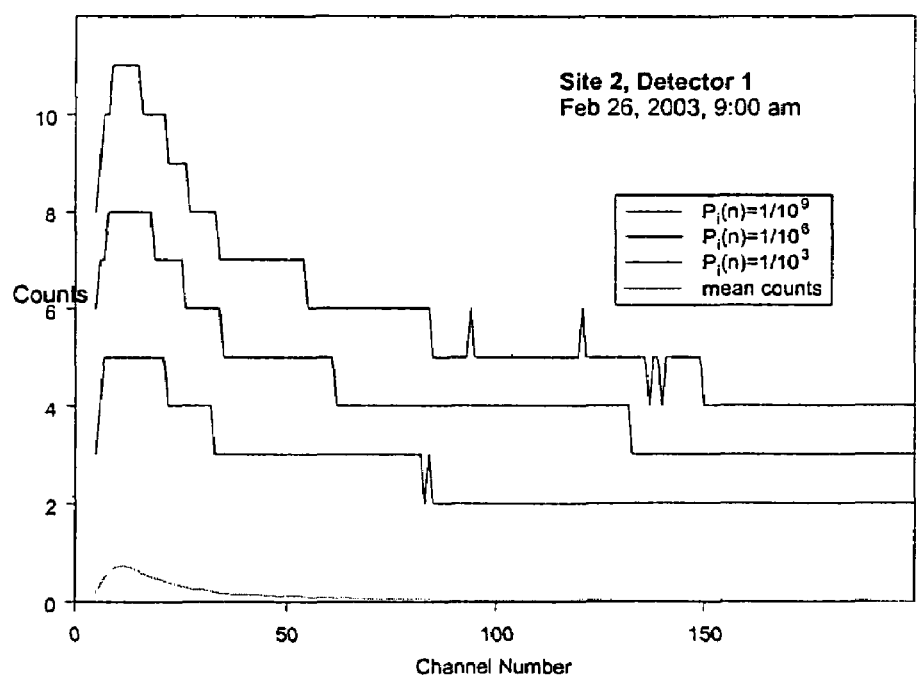
FIG. 4 is a graph of the counts required to exceed probability levels in a single detector, single time slice.

For illustration, the background shown in FIG. 3 was accumulated over 1000 seconds, and scaled to give the expected number of counts in a 0.125 second time slice. For this particular detector, at this particular time, the expected number of background counts in a 0.125 second time slice is less than one in all channels; these are the values of $r_i\tau$ used in Equation 1. A spectrum is checked by using the actual number of counts that occurred in each channel during the time slice (n in Equation 1). If the probability that the fluctuation is due to background is sufficiently small, a hit is considered to have occurred. The number of counts required to exceed various probability levels is shown in FIG. 4.

Simply obtaining counts above a predetermined threshold level in a channel is not sufficient to qualify an event, however. There must also be counts in the other detector in the same channel. This is because background counts are not correlated across the detectors. Only sources give counts simultaneously in both detectors. Comparing the counts of two or more detectors, and noting as a source only those instances in which both detectors register counts, is one of the main ways in which false alarms due to background fluctuations are reduced. In this way, the required count threshold for a single detector can be set quite low, while still yielding a low rate of false alarm.

The sensitivity of the system is increased by using correlations across time slices and across the energy spectra. As previously identified, background counts do not correlate from one time slice to the next. Instead, the time correlations are seen only while a radioactive source is passing in front of the detector. Events with a low probability due to background fluctuations that repeat from time slice to time slice are a unique signature of a passing radioactive source.

Finally, most photopeaks occur in more than one channel. When a source is present, the counts over a region of channels or energy bins increases. This is another signature unique to radioactive sources. Furthermore, the width of a peak varies with channel number. The larger the bin or channel number, the wider the peak. The analysis program of the present invention looks for anomalous numbers of counts over regions consistent with the width of a predicted source photopeak.

Basic Implementation

Background spectrum is first obtained for the 256 channels in the spectrum and recorded over some period of time, typically 1000 seconds, as was undertaken to obtain the background in FIG. 3. At 1000 seconds of counting time there is a low probability that there will be zero counts in a channel, i.e., that $r_i$ will be zero. The average number of counts that could be expected per second is then found by dividing each channel by the 1000 second acquisition time. The Poisson formula is written in natural log form as $$-\ln(P_i(n))=r_i\tau+\ln(n!)-n(\ln(r_i)+\ln(\tau)) \qquad \text{Equation 2}$$

Given the small probabilities being used, this implementation reduces round off errors and provides values that are more easily implemented. As the formula uses the natural log of the scattering rate, a value of zero for $r_i$ must be avoided. The long background acquisition time (1000 seconds) helps to avoid this pathological situation. Also, the program checks for a value of zero in background bins. Any bin with a zero is changed to a value of one. Since the acquisition time τ actually varies slightly from time slice to time slice, this number is measured and the actual acquisition time is used in the calculation.

The average scattering or background rate $r_i$ is contained in a 256 element array, as is the $\ln(r_i)$. The natural logs of n! from 0–50 are also pre-computed, and stored in an array. Values of n greater than 50 use ln(50!). At the highest background rate, the peak number of counts expected in a time slice is a little greater than one, and the probability of more than 50 counts occurring due to background alone is so low as to be meaningless. The negative of the natural log is used to make hits appear as positive numbers. The probability values for a 256 channel spectrum can be calculated in about 50 τs. In the two-detector system, there are 50 ms of time within which to do the hit calculations, so with the current algorithm there are no calculation time issues.

Counts from the photopeak usually occur over a number of channels. The width of the peak increases with increasing channel number. Because of this, the value of $r_i$ is actually the mean number of counts expected over a number of adjacent channels, with the number of adjacent channels corresponding with the expected width of the photopeak. The number of channels to be summed, i.e., the width of the window, for the current spectra corresponds with the width of the window taken when determining the background or scattering rate. This number of channels used in the sum is shown in Table 1.

Figure 5:
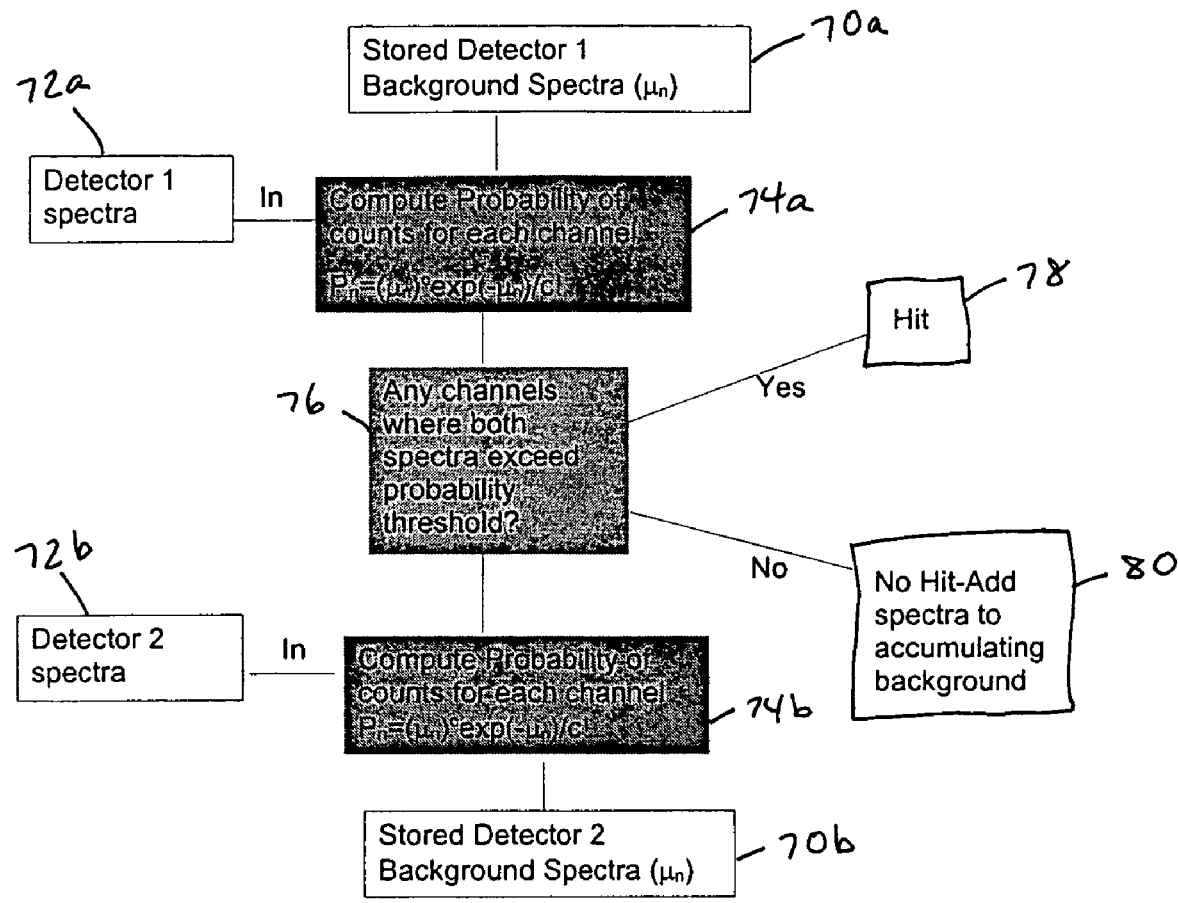
FIG. 5 is a flowchart of the hit detection process.

FIG. 5 provides a conceptual overview of the hit detection process. Background spectra ($\mu_n$) is stored for each detector, step 70, with $\mu_n$ being the average number of counts over the number of channels constituting the expected photopeak width. Spectra from each detector is then collected, step 72, and the probability of the counts from each channel having resulted from background is computed, step 74, using the following formula, $$P_n = (\mu_n)^c \exp(-\mu_n)/c!  \qquad \text{Equation 3}$$

where c is the number of counts from the current spectra over the same number of channels used to obtain $\mu_n$. Spectra determined to be below a probability threshold in corresponding channels of the two detectors, step 76, is identified as a "hit" arising from a radioactive source, step 78. Spectra which does not demonstrate this correlation is added to the background spectra, step 80, whether for the first detector 70a or the second detector 70b.

The process of FIG. 5 may be repeated for spectra from consecutive time slices to identify those spectra also showing correlation across two or more sequential time slices, with the probabilities from multiple time slices being summed and compared with threshold values to determine whether or not the spectra represents a hit.

For channels 0–25, the calculated probability is based on one channel and two time slices. This means $-\ln(Pi)$ from the preceding time slice is added to the present probability. The previous two time slices for the second detector are also summed and, if the count probability from each detector is below some maximum threshold, the event is classified as a radioactive source.

Alternatively, in considering multiple time slices, the probability 74a obtained from two slices with the first detector 72a may be added to the probability 74b for the corresponding two time slices for the second detector 72b, and if the resulting sum is below a threshold, the event is classified as a radioactive source provided that the count probability from each detector is also below some maximum threshold. This reduces the probability that a large background fluctuation in one detector could be mistaken for a radioactive source. If the event passes both of these tests, it is considered to be caused by a passing source.

TABLE 1

Summing width as a function of channel number

| Channel Numbers | Number of summed channels |
|---|---|
| 0–25 | 1 (i) |
| 26–75 | 3 (i +/− 1) |
| 76–125 | 5 (i +/− 2) |
| 126–175 | 7 (i +/− 3) |
| 176–250 | 9 (i +/− 4) |

The calculations are similar for energy bins greater than channel 25. However, because the photopeaks are spreading with higher channel numbers, the number of channels over which the probabilities must be summed increases. For channels 26–75, the probability for channel i is calculated by summing counts over three channels. The number of channels used in the sum is determined by measuring the $e^{-1}$ peak width as a function of peak channel number. The same time steps taken with regard to time slice and detector are then performed with this probability.

A spectrum is analyzed for a hit by using Equation 2. The probability that the number of counts over the channels occurred due to background is calculated. This probability of occurrence vs. channel number is summed with the natural log of the probabilities from the previous time slice. Since a source is expected to be in the field of view for at least two time slices, counts from sources should be elevated over two adjacent time slices. This is compared with the probability vs. channel number of the other detector. Currently, if either of the detectors has a channel with probability due to background of less than $10^{-9}$, or if both detectors have a channel (the same channel in each detector) with a probability of less than $10^{-6}$, the event is counted as a radioactive source. These numbers have not been optimized with respect to sensitivity and false alarm rate. The values were sufficient for the sources used in system demonstrations.

System sensitivity can be estimated from FIG. 4. With the current threshold values used (both detectors must be showing a two-time slice probability of $10^{-6}$) the number of counts required as a function of channel can be calculated. For lower energy channels (channels 0–25) with higher background rates, about three to four counts/time slice must be reported from each detector in order for the event to be counted as a radioactive source. Higher energy channels, with lower backgrounds, will be reported as a hit if one or two counts/time slice are observed in each detector, in the same energy bin.

The system described herein applies to other radiation detectors using a multi-channel analyzer, such as cesium iodide (CsI) and high-purity germanium (HPGe) detectors. In the case of detectors capable of high spectral resolution, such as HPGe, the software would be required to operate with a larger number of channels in many applications. This change is a straightforward extension of the current system.

Practitioners of ordinary skill will recognize that while the foregoing presentation of the preferred embodiment calculated the probability that the counts were from background, the equivalent result of the invention, that is, comparing probabilities in order to detect correlated counts across detectors or time slices, can be achieved by calculating the probability that the counts were from a source. That is, the first probability is one minus the second probability because either the counts are from background or they are from a radioactive source. Therefore, wherever in the description of the process the probability that the counts are from background is calculated and the value checked to be below a threshold, the invention can equivalently be implemented by calculating the probability that the counts are from a source, and checking whether that value is above a threshold.

The foregoing descriptions and drawings should be considered as illustrative only of the principles of the invention. The invention may be otherwise configured and is not limited to the configurations of the preferred embodiment. Numerous applications of the present invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

What is claimed is:

1. A method executed by a radiation source detection system for detecting low-level radioactive sources moving past a detection apparatus comprising:

Measuring the approximate number of radioactive radiation counts that occur during each of at least two substantially distinct time slices occurring during the approximate time period the source passes the apparatus; and Calculating the probability that the measured counts received in each of the at least two time slices is attributable to background radioactive radiation;

Determining the degree that the set of calculated probabilities correlate with a radioactive radiation source passing the detector during the approximate time period;

Storing the result of the determination step.

2. The method of claim 1 where the determining step is comprised of calculating for each of the at least two time slices, the probability that the radiation counts during the time slices came from background and determining whether all of the calculated probabilities are less than or equal to a threshold value.

3. The method of claim 1 where the determining step is comprised of calculating for each of the at least two time slices, the probability that the radiation counts corresponding to the time slices came from background and determining whether for some integer n, n of the calculated probabilities are less than or equal to a threshold value where the threshold value is selected as a function of the value of n and n is a number between and including 1 and the number of calculated probabilities.

4. The method of claims 1, 2 or 3 where the measuring step detects the counts occurring within a pre-determined spectral window.

5. A method executed by a radioactive radiation source detection system for detecting low-level radioactive sources moving past a detection apparatus comprising:

Measuring the approximate number of radioactive radiation counts that occur during each of a plurality of substantially distinct time slices occurring during the approximate time period that the radioactive source passes the apparatus;

Calculating for each time slice within a subset of the plurality of time slices the probability that the radioactive radiation counts for the time slice came from background where the subset has at least two elements; and Determining the degree that the set of calculated probabilities correlate with a radioactive radiation source passing the detector during the approximate time period;

Storing the result of the determination step.

6. The method of claim 5 where the determining step is comprised of determining whether for some integer n, n of the calculated probabilities corresponding to the time slices in the subset are less than or equal to a threshold value where n is a number between and including one and the number of elements in the subset.

7. The method of claim 6 further comprising selecting the threshold value as a function of the number of n.

8. The method of claim 5, 6 or 7 where the size of the subset is in the range from 1 to 1000.

9. The method of claims 5, 6 or 7 where the counts are measured within a spectral window.

10. The method of claim 9 where the spectral window is comprised of at least one energy channel.

11. A method executed by a radioactive radiation source detection system for detecting low-level radioactive sources moving past a detection apparatus comprising:

Measuring the approximate number of radiation counts detected by at least two detectors comprising the apparatus; and Determining the degree that the set of measured radioactive radiation counts correlate with a radioactive radiation source passing the detectors during the approximate time period;

Storing the result of the determination step.

12. The method of claim 11 where the determining step is further comprised of calculating for each of the at least two detectors, the probability that the radiation counts from the detector came from background and determining whether for some integer n, n of such calculated probabilities are less than a threshold value where n is a number between and including two and the number of calculated probabilities and the threshold value is selected as a function of n.

13. The method of claims 11 or 12 where the measurement step detects radiation counts within a pre-determined spectral window.

14. The method of claim 13 where the spectral window is comprised of at least one energy channel.

15. A method executed by a radioactive radiation source detection system for detecting low-level radioactive sources moving past a detection apparatus comprising:

Measuring the approximate number of radiation counts detected by a plurality of detectors comprising the apparatus; and Calculating the probability that the measured counts received in each of the plurality of detectors is attributable to background radioactive radiation;

Determining the degree that the set of calculated probabilities correlate with a radioactive radiation source passing the detector during the approximate time period;

Storing the result of the determination step.

16. The method of claim 15 where the subset size is between 1 and the number of detectors in the plurality.

17. The method of claim 15 where the determining step is comprised of determining whether for some integer n, n, of the calculated probabilities corresponding to the detectors in the subset are less than a threshold value where n is a number between and including 2 and the number of elements in the subset.

18. The method of claim 17 further comprising selecting the threshold value as a function of the number n.

19. The method of claim 15, 17 or 18 where the size of the subset is in the range from 1 to 1000.

20. The method of claims 15, 17 or 18 where the counts are measured within a spectral window.

21. The method of claim 20 where the spectral window is comprised of at least one energy channel.

22. The method of claim 20 where the spectral window is comprised of between 1 and 255 energy channels.

23. The method of claim 20 where the number of energy channels used in the spectral window is determined by measuring the $e^{-1}$ peak width as a function of peak channel number where e is the base of the natural logarithm.

24. A method executed by a radioactive radiation source detection system for detecting low-level radioactive sources moving past a detection apparatus comprising:

Measuring in each of at least two detectors comprising the apparatus the individual approximate number of radioactive radiation counts during each of at least two substantially distinct time slices occurring approximately during the time period the source passes the apparatus; and Determining the degree that the set of measured radioactive radiation counts correlate with a radioactive radiation source passing the detectors during the approximate time period;

Storing the result of the determination step.

25. The method of claim 24 where the determining step is further comprised of determining whether for some integer pair n,m n of the detected radiation counts corresponding to the at least two of the time slices is greater than or equal to a first threshold and m of the detected radiation counts corresponding to the at least two detectors is greater than or equal to a second threshold.

26. The method of claim 25 where the determining step is further comprised of selecting the first threshold and the second threshold as a function of the integer pair n,m.

27. A method for detecting low-level radioactive sources moving past a detection apparatus comprising:
Measuring the approximate number of radioactive radiation counts for each of a plurality of substantially distinct time slices occurring during the approximate time period that the radioactive source passes the apparatus;
and determining whether for some integer n, n of the radiation counts corresponding to the plurality of time slices are greater than or equal to a pre-determined threshold, where the number n is greater than or equal to two and less than or equal to the number of time slices;
Storing the result of the determination step.

28. The method of claim 27 where the determining step is further comprised of selecting the threshold as a function of the number n.

29. A method for detecting low-level radioactive sources moving past a detection apparatus comprising:
Measuring the approximate number of radioactive radiation counts detected by a plurality of detectors comprising the apparatus during the approximate period of time the source passes the apparatus;
and determining whether for some integer n, n of the radioactive radiation counts corresponding to the plurality of detectors are greater than or equal to a pre-determined threshold, where the number n is greater than or equalt to two and less than or equal to the number of the plurality of detectors;
Either or both storing the result of the determination step or initiating an alarm if the determination result meets a pre-determined criteria.

30. The method of claim 29 where the determining step is further comprised of selecting the threshold as a function of the number n.

31. The method of claim 1 where the determining step is further comprised of calculating for each of the at least two time slices or a subset of the at least two time slices, the probability that the radiation counts in each time slice is from a source and determining whether the at least two or the subset of the at least two of the calculated probabilities are greater than or equal to a threshold.

32. The method of claim 11 where the determining step is further comprised of calculating for each of the at least two detectors, the probability that the radiation counts from each detector is from a source and determining whether at least two of the calculated probabilities are greater than or equal to a threshold.

33. The method of claims 2, 3, 6, 7, 12, 17, 18, 27, 28, 29 or 30 where the threshold is between $10^{-4}$ and $10^{-8}$.

34. The method of claims 2, 3, 6, 7, 12, 17 or 18, 27, 28, 29 or 30 where the threshold value is between $10^{-7}$ and $10^{-11}$.

35. The method of claims 1, 2, 3, 5, 6, 25, 27, 28, or 31 where the time slices are between about 0.05 seconds and 1 second in width.

36. The method of claims 1, 2, 3, 5, 6, 25, 27, 28, or 31 where the time slice durations are less than about one-half of the time period.

37. An apparatus for detecting low-level radioactive sources moving past the apparatus comprising:
At least one detector that generates a radiation count as a result of its detection of a radiation event;
At least one analyzer, operatively coupled to the detector, where the analyzer determines the approximate number of radiation counts corresponding to each of at least one energy channel during at least one substantially distinct time slice during the approximate time period that the source passes the apparatus; and
At least one control computer operatively connected to the at least one analyzer where the control computer contains in its internal memory a computer program that uses the detected counts as data and alerts a hit when the program calculates a correlation among the detected counts with respect to a subset of either the at least two detectors or the at least two time slices or both that is consistent with a radiation source where such subset has at least two elements.

38. The apparatus of claim 37 where the computer program calculates the probabilities for a spectral window comprised of at least one energy channel.

39. The apparatus of claim 37 where the detectors are comprised of either cesium iodide or high-purity germanium or both.

40. An apparatus for detecting low-level radioactive sources moving past the apparatus comprising:
At least one detector that generates a radiation count as a result of its detection of a radiation event;
At least one analyzer, operatively coupled to the detector, where the analyzer determines the approximate number of radiation counts corresponding to at least one energy channel during at least one substantially distinct time slice during the approximate time period that the source passes the apparatus; and
At least one control computer operatively connected to the at least one analyzer where the control computer, when operated in the apparatus, causes the apparatus to perform the methods claimed in any one of claims 1, 2, 3, 5, 6, 7, 11, 12, 15, 16, 17, 18, 24, 25, 26, 27, 28, 29, 30, 31 or 32.

41. A medium for storing digital data having a computer program recorded thereon, such that when the program is loaded onto a computer and run, the computer will, when operatively connected to at least one analyzer that is operatively connected to at least one detector, execute the methods as claimed in any one of claims 1, 2, 3, 5, 6, 7, 11, 12, 15, 16, 17, 18, 24, 25, 26, 27, 28, 29, 30, 31 or 32.

42. The method of claim 24 where the correlation step is further comprised of calculating for each of the at least two detectors for each of the at least two time slices, the probability that each measured count corresponding to the detector during the time slice came from background.

43. The method of claim 42 further comprising, determining whether for some integer pair n,m, n of the calculated probabilities for any of the at least two detectors during any time slice is below a first threshold and m of the calculated probabilities for any of the time slices corresponding to any detector is below a second threshold.

44. The method of claims 27, 28 or 29 where the threshold is between and including one count and twelve counts.

45. A method executed by a radiation source detection system for detecting low-level radioactive sources moving past a detection apparatus comprising:

Measuring the approximate number of radioactive radiation counts that occur during each of a plurality of substantially distinct time slices occurring during the approximate time period that the radioactive source passes the apparatus;

Calculating for each time slice within a subset of the plurality of time slices the probability that the radiation counts for the time slice came from a radiation source where the subset has at least two elements;

Determining the degree that the set of calculated probabilities correlate with a radioactive radiation source passing the detector during the approximate time period;

Storing the result of the determination step.

46. The method of claim 45 where the determination step is comprised of determining whether for some integer n, n of the calculated probabilities corresponding to the time slices in the subset are greater than or equal to a threshold value where n is a number between and including one and the number of elements in the subset.

47. The method of claim 46 further comprising selecting threshold value as a function of the number of n.

48. The method of claim 46 where the threshold value is between approximately 0.99 and 1.

* * * * *